United States Patent

[11] 3,538,935

| [72] | Inventor | Kenneth L. Shelter<br>Chili, New York |
|---|---|---|
| [21] | Appl. No. | 781,295 |
| [22] | Filed | Oct. 15, 1968 |
| [45] | Patented | Nov. 10, 1970 |
| [73] | Assignee | Sybron Corporation<br>Rochester, New York<br>a corporation of New York |

[54] PNEUMATIC CONTROL MECHANISM
10 Claims, 4 Drawing Figs.

[52] U.S. Cl. .................................................. 137/82
[51] Int. Cl. ..................................................G05d 16/00,
F15b 5/00

[50] Field of Search ................................. 137/82, 85, 86

[56] References Cited
UNITED STATES PATENTS
3,090,395  5/1963  Weiss ........................ 137/86

*Primary Examiner*—Alan Cohan
*Attorney*—Peter J. Young, Jr. and Joseph C. MacKenzie ABSTRACT: A baffle-nozzle motion detector is mounted for rotation about the axis of a cylindrically bored sleeve. The nozzle is coupled to an air supply by a torsionally deformable, flexible cylindrical pipe running coaxially through the sleeve.

PNEUMATIC CONTROL MECHANISM

This invention relates to pneumatic control mechanisms wherein a control or measurement effect is created or varied in consequence of detecting motion by means of a baffle and nozzle arrangement. As is well known, in this arrangement, a baffle motion of one-thousandth of an inch or so suffices to create the maximum change in nozzle back pressure. On the other hand, the baffle and nozzle may be subject to much larger motions in order to adjust the relationship between the motion to be detected and the motion of the baffle.

In the type of mechanism to which the present invention relates, the nozzle and baffle, for adjustment purposes, are mounted for bodily motion about a given axis. Accordingly, the air supply has to be connected to the nozzle by some piping arrangement allowing, say, 360° rotation, or thereabouts, of the nozzle. In the past, more or less rigid but rotatable pipe couplings, which are relatively compact, but are complex and prone to leakage, have been proposed. Again, more or less leakfree and simple coils of flexible pipe, which are cumbersome, unsightly and often in the way, have also been proposed. In the present invention, a flexible pipe is arranged to function as a rotatable pipe coupling, which is simultaneously leakfree, compact, simple and unobtrusive. Briefly, the baffle and nozzle are supported on a rotatable member. The member is supported for rotary adjustment by a simple sleeve bearing. The air connection to the nozzle is made by a length of plastic pipe that is coaxial with the sleeve, and, in general, is run in close proximity to the parts of the control mechanism. The pipe is torsionally deformable in the sleeve but little or no lengthwise deformation occurs.

FIG. 1 of the attached drawings is an elevation of a pneumatic control mechanism according to the invention.

Figure 1:
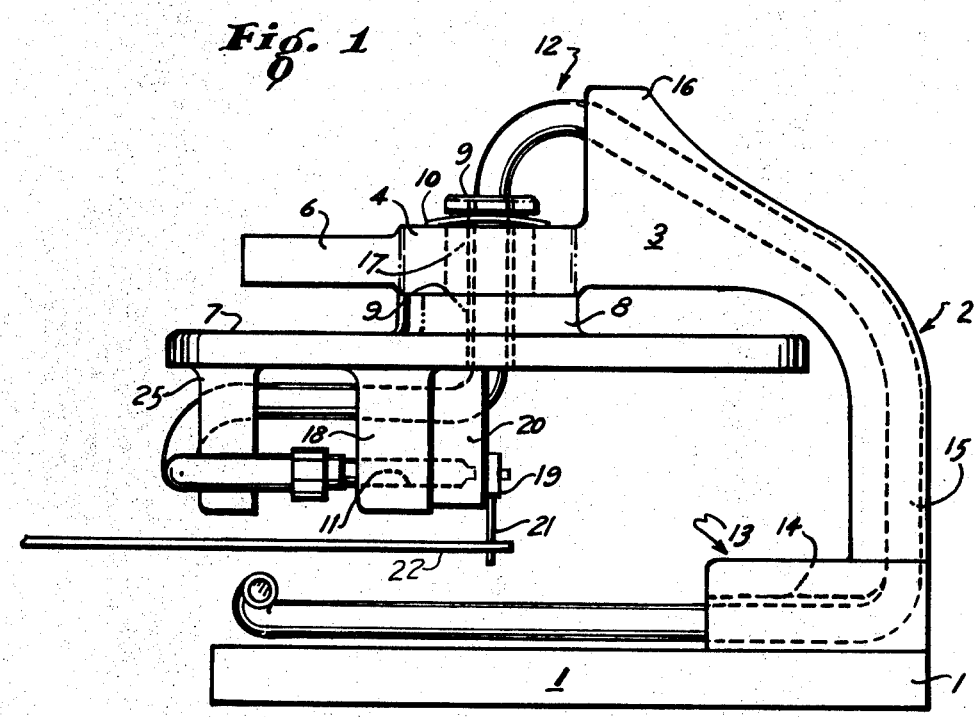

In FIG. 1, a flat base 1 mounts a bracketlike support 2 having a cantilever portion 3 extending over the base. Portion 3 includes a sleeve 4 having a circularly cylindrical bore 5 (shown in dotted line in FIG. 2). The bore opens at both the top and bottom of the portion 3, and its axis is normal to the plane of the base 1. A pointerlike extension 6 of sleeve 4 extends over a circular flat disc 7. Disc 7 has a flat annular boss 8 having a circularly cylindrical-bored sleeve 9 rotatably fitted in bore 5. The upper end of sleeve 9 extends up out of the bore 5 into a spring washer fixed to said upper end, seating on the flat surface around the upper end of bore 5 and drawing the disc 7 so that the upper surface of boss 8 seats snugly on the flat surface around the lower end of bore 4. The interfitted parts are proportioned to fit without substantial play, with the washer 10 taking up what play there may be and holding the parts tightly together, without, however, so tightly as to prevent the disc from being rotated if a modest turning moment be exerted thereon by hand. The arrangement described is a typical sort of swivel coupling, old as such.

A nozzle tube 11 is supported on the lower surface of disc 7, along with other structure, to be described later on below, and it is necessary to provide for coupling the nozzle tube to the usual source of instrument air, typically a regulator or controller device (not shown) providing air at up to 20 pounds per square inch gauge to a pipe (not shown) connected to said nozzle tube by a restrictor (not shown) so that a superatmospheric pressure exists in the nozzle tube, at a value depending on the rate at which the nozzle tube can bleed air to the ambient atmosphere. This, too, is a typical sort of arrangement old in itself.

Connection to said nozzle tube is made by means of a torsionally deformable pipe 12, preferably made of the plastic called Viton, or equivalent material, only so much pipe being shown as extends from the nozzle 11 to the base 1. Thus, a ring clamp seals one end of the portion shown of pipe 12 around one end of nozzle 11, whereas the other end is shown lying on the base 1 after emerging from the foot 13 of support 2. It will be observed that pipe 12 enters a channel 14 in foot 13, emerges therefrom into a channel 15, follows the length of the support, via channel 15, leaves the channel 15 and extends down through sleeve 9 and disc 7, emerging at the lower side of disc 7. The channels 14 and 15, as shown, are essentially one groove along the support 2, but could be a bore entirely contained with the support. As shown, the pipe 12 is assisted in staying in the channels by the surface of base 1 covering channel 14 and a sort of clip element 16 of support 2, which element extends over the upper end of channel 15 and frictionally holds the adjacent portion of pipe 12 down in this end of channel 15.

The sleeve 9, boss 8 and disc 7 define a circularly cylindrical bore 17 (shown in dotted line), through which pipe 12 passes. Preferably, said bore 17 is just the diameter of pipe 12, so that the latter actually fits in bore 17 more snugly than the drawing indicates. The axis of bore 17 is the axis of rotation of disc 7.

I find that with the arrangement shown substantially 360° rotation of disc 7 is available without interference from, or undue deformation of, pipe 12. Yet, it will be observed that such rotation does not require any lengthwise slack in pipe 12. If the pipe 12 be traced from base 1 to nozzle tube 11, it will be noted that the only deviations of the pipe from a path of straight line segments are those required to provide for changes in pipe direction. That is, the pipe has to make such changes with appreciable radius of curvature to avoid crimping at the bends. In effect, the deformation of pipe 12 due to rotating disc 7 is purely torsional. Obviously, the pipe material does displace along the pipe length when twisted, but such displacement is distributed over a length of the pipe. The unbuckled pipe bends where pipe 12 enters and leaves sleeve 9, which would be provided anyway, even if rotation of disc 7 were not contemplated, provides enough pipe length to take up the displacement due to twisting of the portion of pipe 12 in the sleeve 9.

Figure 4:
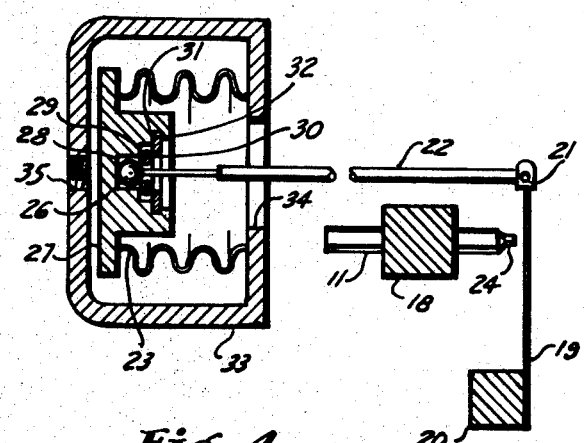
FIG. 4 shows a detail not completely visible in the views of FIGS. 1 and 2.

Nozzle tube 11 is mounted in a block 18 which is part of, or is fixed to, disc 7. A baffle 19 is fixed at one end to a block 20 also fixed to or a part of disc 7. The baffle may be supposed to pivot to block 20, or to be elastic, so that it can be deflected in a plane normal to the plane of FIG. 1 (that is to say, in the plane of the paper from point of view of FIG. 4). A pivot pin 21 provides pivotal interconnection between baffle 19 and a link 22, link 22 being moved by a bellows 23, as shown in FIG. 4. The parts are arranged so that the pivot axis of pivotal interconnection 21 is coincident with the axis of rotation of disc 7. Accordingly, as disc 7 is turned, the baffle 19 will simply deflect about the axis of rotation of disc 7 (supposing that at the same time link 22 remains fixed in position). As will be seen from FIG. 4, if link 22 moves so as to have a component of motion along its length, the baffle 19 will move with respect to the discharge nozzle 24 and nozzle tube 11. Further, the ratio between baffle motion and link motion will depend on the angular position of disc 7, and whether or not the baffle approaches or retreats from the nozzle 24 will also depend on the angular position of the disc.

The portion of pipe 12 below disc 7 is brought around a block 25 fixed to or forming part of disc 7. Block 25 provides a guide for configuring this portion of pipe to suit the location and orientation of nozzle tube 11. Normally, tube 11 will be arranged to be removable or adjustable in block 18, so it is convenient to expose the pipe-connected end of tube 11 for ease in the manipulations thus involved. Otherwise, the pipe could just as readily be run along the radius of disc 7 to block 18 to, say, a side connection on tube 11, or the like, because the amount of pipe 12 involved in torsional deformation is about that part of it which is in bore 17 plus the bends where the pipe exits from this bore at each end thereof.

In an actual example, the length of bore 17 was three-fourths inch, the pipe 12 was 0.145 inch O.D., Viton tubing (0.077 inch I.D.), and the pipe length between clip portion 16 and the upper bore opening of sleeve 9 was about three-fourths inch. Viton is a fluorinated hydrocarbon elastomer.

Figure 3:
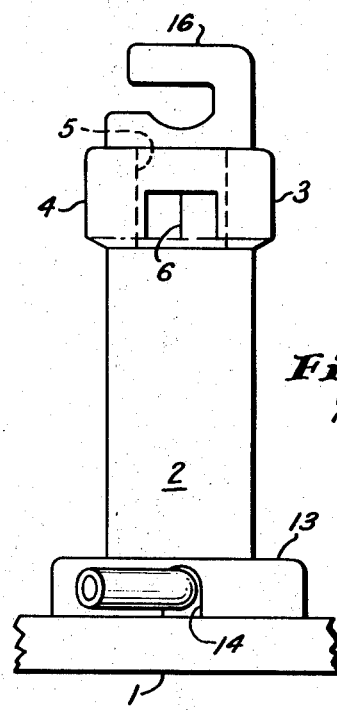
FIG. 3 is an elevation of part of said mechanism, the view being taken from the left as seen in FIG. 1.
Figure 2:
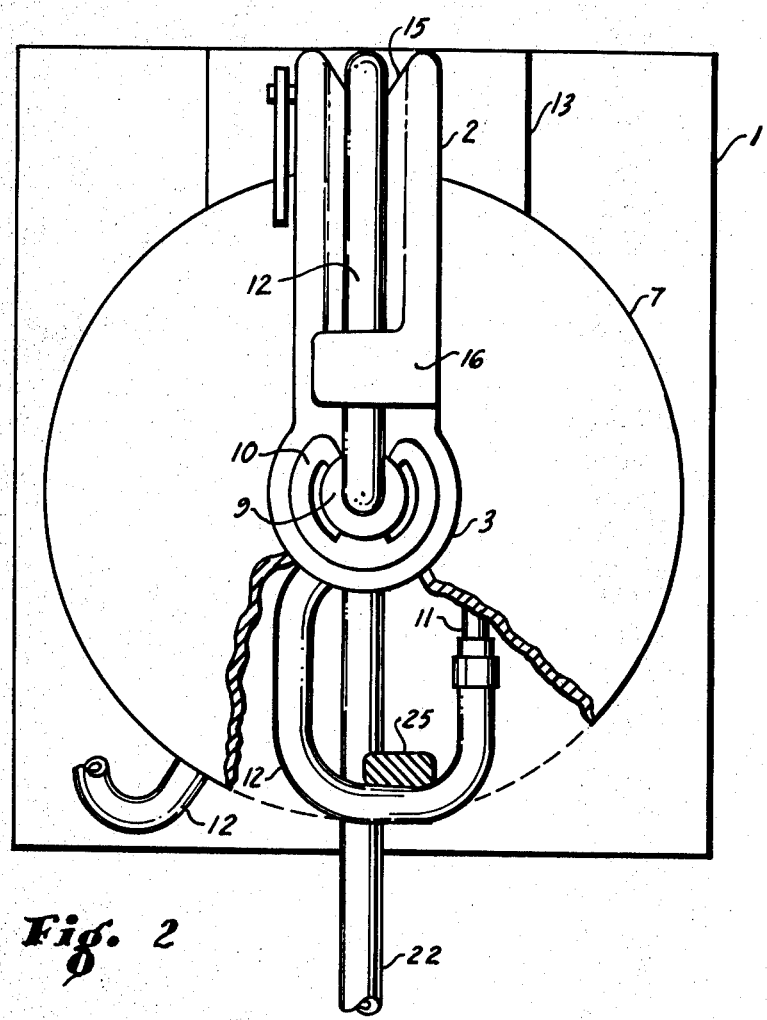
FIG. 2 is a plan view of said mechanism, broken away in part.

However, pipe of rubber and other flexible materials could be used instead of Viton pipe. Except for the base 1, the proportions used in FIGS. 1, 2 and 3 are substantially twice those of an actual mechanism. The link 22 ends in a ball 26 coupled to the end plate 27 of bellows 23. The end plate 27 has a cylindrical recess 28, the axis of which is more or less aligned with the length of link 22.

The axial length of recess is a little less than the diameter of ball 26, which in turn, is slightly less than the diameter of the recess 28. On a ledge 29 around the opening of the recess 28 is seated an O-ring 30, and on a ledge 31 around the opening of recess is seated a spring retainer 32, or equivalent. The axial distance from ledge to ledge is such that with the O-ring 30 and ball in place, the washer 32 squeezes the O-ring 30 down on the ledge 29 and on the ball 26, and forces this last against the bottom of the recess. At the same time the opening in washer 32 is large enough to allow the ball 26 to pass through it freely, and the opening in the O-ring 26 is enough less than the diameter of the ball that the ball has to be forced through the O-ring, deforming it radially in order to bottom the ball in the recess. Once the ball is through the O-ring, the latter only partly recovers its free shape, as the ball is forcing it against the washer 32.

In this way, ball 26 fits in place, without play, insofar as motion of the link 22 along its length is concerned, and provides for easily and quickly coupling and uncoupling the link from bellows 23.

Bellows 23 provides for moving link 22 in response to pressure and to that end is provided with a rigid housing 33 having an opening 34 through which link 22 passes, and on opening 35 to which is to be connected suitable means (not shown) for providing a variable pressure within housing 33 around bellows 23. Bellows 23 is, of course, a cylindrical corrugated device, shown in axial section, which has its right-hand end sealed to the housing 33 around opening 34.

Those skilled in the art will recognize that which the pneumatic control mechanism as shown is useful as such, more commonly it will form part of a so-called controller, wherein the motions of baffle 19 are under control of a rather more complex mechanism than a mere link 22 and bellows 23. An apt illustration is Jaquith U.S. Pat. No. 3,047,002, July 31, 1962, assigned to the assignee of the present application, wherein in FIG. 3 the ball 27 corresponds to pivot pin 21 of the present application. Indeed, it will be seen that the bellows and controller circuitry of Jaquith's FIG. 3 could be combined bodily with FIG. 1 of the present invention with no change but replacement of ball 27 with pin 21, to obtain a controller functionally identical to Jaquith's.

While I have described my invention in the manner required by 35 USC 112, such description is intended as exemplary and not limiting. Further, various modifications and uses thereof will be obvious to those of ordinary skill in the art, and nevertheless will fall within the scope of the claims appended hereto.

I claim:

1. A pneumatic control mechanism comprising a baffle; a nozzle; a rotatable member; a base; a support fixed to said base and having a free end extending thereover; pipe means on said base and on said support; said baffle and said nozzle being on said member; a coupling fixed to said free end and to said member and providing for rotation of said member on a given axis; a segment of which axis extends through said coupling; said coupling having a passage containing said segment; and a torsionally deformable length of flexible pipe in said passage and extending out therefrom at one end thereof to a connection with said nozzle, and extending out therefrom at the other end thereof to a connection with said pipe means, said length being of sufficient total extent as to allow substantially free rotation of said member on said axis whereby to provide for adjustment of the position of said baffle and nozzle.

2. The pneumatic control mechanism of claim 1, wherein said pipe means and said flexible pipe form an unbroken length of flexible pipe.

3. The pneumatic control mechanism of claim 2, wherein said pipe means follows and is secured along the length of said support.

4. The pneumatic control mechanism of claim 3, wherein said support is channeled along its length receiving said pipe means.

5. The pneumatic control mechanism of claim 1, wherein said baffle is a lever arranged to move one end toward and away from said nozzle by deflection of said lever on an axis parallel to said first axis but spaced therefrom.

6. The pneumatic control mechanism of claim 5, wherein the other end of said lever has a pivotal connection to a link, said pivotal connection being located so that the said given axis and the axis of said pivotal connection are substantially coincident.

7. The pneumatic control mechanism of claim 1, wherein said coupling includes a cylindrically bored first sleeve coaxially and rotatably mounted within a second cylindrically bored second sleeve, said passage including the cylindrical bore of said first sleeve; one said sleeve being part of said free end and the other said sleeve being part of said member.

8. The pneumatic control mechanism of claim 7, wherein said first sleeve is part of said member.

9. The pneumatic control mechanism of claim 1, wherein said member is flat, said free end extends over one side thereof and said nozzle is mounted on the other side thereof.

10. The pneumatic control mechanism of claim 9, wherein said passage extends through said member along said axis.